(12) United States Patent
Berg et al.

(10) Patent No.: US 8,295,611 B2
(45) Date of Patent: Oct. 23, 2012

(54) ROBUST VIDEO RETRIEVAL UTILIZING AUDIO AND VIDEO DATA

(75) Inventors: Jared S. Berg, Cambridge, MA (US);
Andrew E. Merlino, Jr., Burlington, MA (US); Paul Yi, Nashua, NH (US);
Dean R. Doody, Middletown, MD (US)

(73) Assignee: Pixel Forensics, Inc., Burlington, MA (US)

( * ) Notice: Subject to any disclaimer, the term of this patent is extended or adjusted under 35 U.S.C. 154(b) by 720 days.

(21) Appl. No.: 12/538,476

(22) Filed: Aug. 10, 2009

(65) Prior Publication Data
US 2011/0035373 A1 Feb. 10, 2011

(51) Int. Cl.
*G06K 9/62* (2006.01)
(52) U.S. Cl. ......... 382/209; 382/219; 382/190; 382/195
(58) Field of Classification Search .................. 382/190, 382/195, 209, 219
See application file for complete search history.

(56) References Cited

U.S. PATENT DOCUMENTS

| | | | |
|---|---|---|---|
| 5,982,979 A | 11/1999 | Omata et al. | |
| 6,404,925 B1 * | 6/2002 | Foote et al. | 382/224 |
| 6,675,174 B1 * | 1/2004 | Bolle et al. | 1/1 |
| 7,167,574 B2 * | 1/2007 | Kim | 382/100 |
| 7,486,827 B2 | 2/2009 | Kim | |
| 8,077,363 B2 * | 12/2011 | Sasaki | 358/505 |
| 8,145,656 B2 * | 3/2012 | Shatz et al. | 707/758 |
| 2004/0258397 A1 * | 12/2004 | Kim | 386/94 |

OTHER PUBLICATIONS

Hauptmann, A.G., et al., "Video Retrieval with Multiple Image Search Strategies," *Joint Conference on Digital Libraries* (JCDL '02), pp. 376, Portland, OR., (Jul. 13-17, 2002).

Chen, L. and Stentiforda, F.W.M., "Video sequence matching based on temporal ordinal measurement," *Pattern Recognition Letters*, 29(13):1824-1831 (Oct. 1, 2008).

Chen, L., et al., "An integrated approach to video retrieval, ACM International Conference Proceedings Series vol. 313,": *Proceedings of the nineteenth conference on Australasian database*, vol. 75: 49-55(2008).

* cited by examiner

*Primary Examiner* — Tom Y Lu
(74) *Attorney, Agent, or Firm* — Cesari and McKenna, LLP

(57) ABSTRACT

Techniques for determining if two video signals match by extracting features from a first and second video signal, and cross-correlating the features thereby providing a cross-correlation score at each of a number of time lags, then determining a mean magnitude of a difference of average values at each of the lags, and finally determining the similarity score based on both the cross-correlation scores and the mean magnitude difference scores, and optionally then outputting an indication of a degree of match between the first and second video signals.

11 Claims, 19 Drawing Sheets

Video Feature Extraction Process Flow Chart

| (1-106,161-240) | (107-212,161-240) | (213-318,161-240) |
| (1-106,81-160) | (107-212,81-160) | (213-318,81-160) |
| (1-106,1-80) | (107-212, 1-80) | (213-318, 1-80) |
Fig. 5
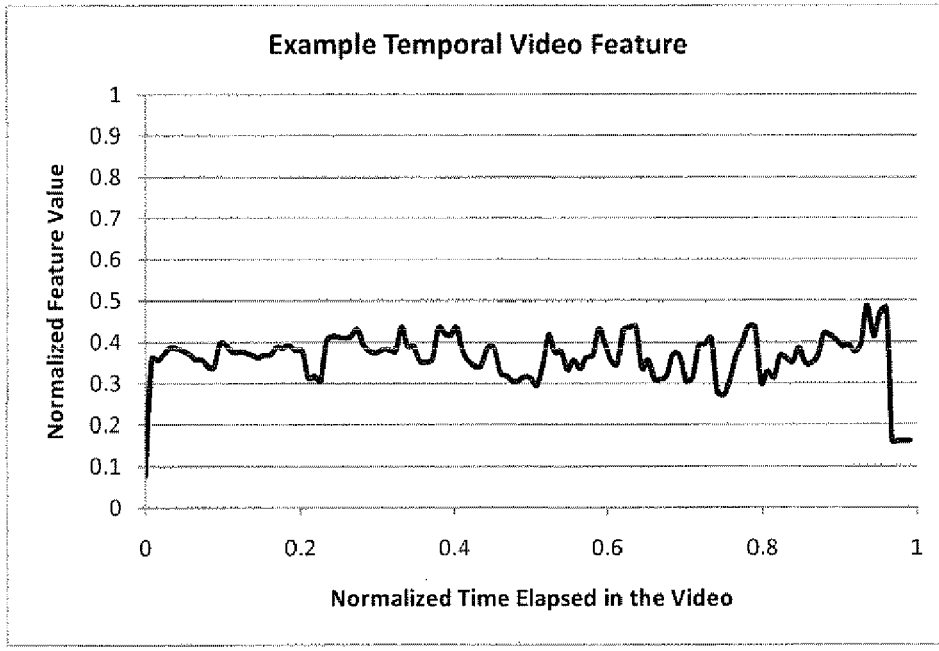
Fig. 6
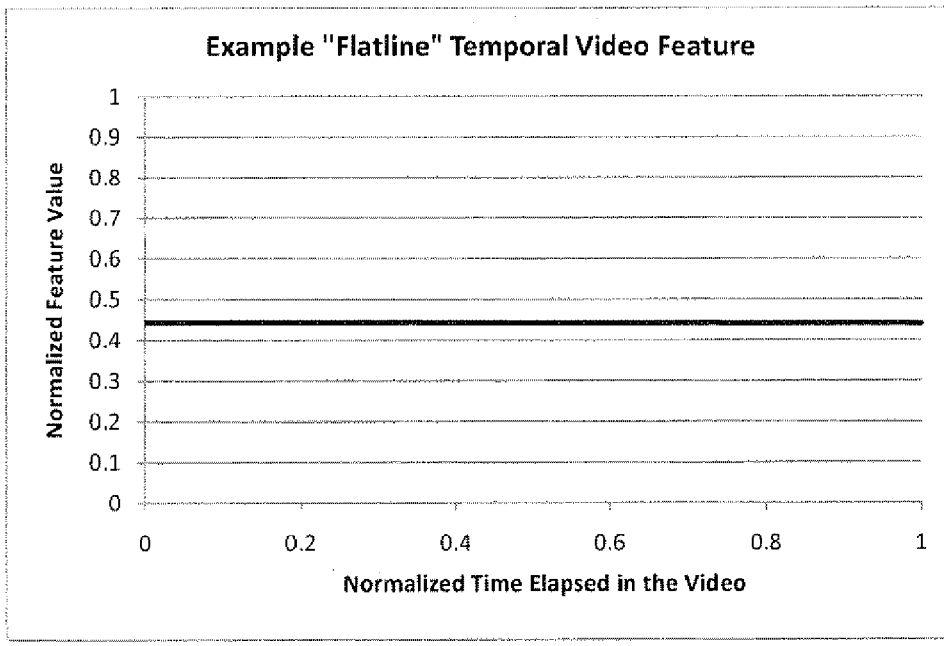
Fig. 7

| 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|
| 32 | 31 | 30 | 29 | 28 | 27 | 26 | 25 | 24 | 23 | 22 | 21 | 20 | 19 | 18 | 17 |
| 33 | 34 | 35 | 36 | 37 | 38 | 39 | 40 | 41 | 42 | 43 | 44 | 45 | 46 | 47 | 48 |
| 64 | 63 | 62 | 61 | 60 | 59 | 58 | 57 | 56 | 55 | 54 | 53 | 52 | 51 | 50 | 49 |
| 65 | 66 | 67 | 68 | 69 | 70 | 71 | 72 | 73 | 74 | 75 | 76 | 77 | 78 | 79 | 80 |
| 96 | 95 | 94 | 93 | 92 | 91 | 90 | 89 | 88 | 87 | 86 | 85 | 84 | 83 | 82 | 81 |
| 97 | 98 | 99 | 100 | 101 | 102 | 103 | 104 | 105 | 106 | 107 | 108 | 109 | 110 | 111 | 112 |
| 128 | 127 | 126 | 125 | 124 | 123 | 122 | 121 | 120 | 119 | 118 | 117 | 116 | 115 | 114 | 113 |

Fig. 15

ROBUST VIDEO RETRIEVAL UTILIZING AUDIO AND VIDEO DATA

BACKGROUND OF THE INVENTION

1. Field of the Invention

The present invention relates generally to digital media and more specifically to the process of quickly, efficiently and accurately retrieval similar videos based on extracted feature comparison.

2. Description of the Related Art

Regarding content based video retrieval, one of two main approaches are usually employed. The first is related to matching specific extracted key frames from one video to another. Key frames are extracted at regular intervals, or sometimes selected by scene change detection algorithms. A popular approach is to simply compare key frames of videos using new or existing content-based image retrieval (CBIR). The second is related to modeling the entire clip, and performing a model based comparison during the retrieval. Another existing video retrieval technique is to model entire video clips in some manner, and then perform a model comparison during retrieval. While other models are available, the main model used is a temporal model.

Key Frame Comparison

Key frames are often extracted at regular intervals, or sometimes selected by scene change detection algorithms. A popular approach is to simply compare key frames of videos using new or existing content-based image retrieval (CBIR). However, this analysis suffers from two large shortcomings.

Some specific examples of existing technology that utilizes key frame comparison for video retrieval are as follows.

1) U.S. Pat. No. 5,982,979

The video retrieving method provides a video retrieval man-machine interface which visually specifies a desired video out of many stored videos by using previously linked picture data corresponding to the videos. Also, a video reproduction operating man-machine interface visually designates the position of reproduction out of the picture group indicative of the contents. The video retrieving method employs video data, character information linked to the video data, picture data linked to the videos, and time information corresponding to the picture data in the video data. The character information is composed of a title of each video and a creation date thereof. The picture data include, as retrieval information, one picture data representing the content of the relevant video (one picture expressing the video, i.e., a leaflet or the like), and a plurality of picture data adapted to grasp the contents of the entire video. The time information indicates the temporal position of the picture data in the video data.

Hauptmann, A. G., Christel, M. G., and Papernick, N. D., Video Retrieval with Multiple Image Search Strategies, Joint Conference on Digital Libraries (JCDL '02), Portland, Oreg., pp. 376, Jul. 13-17, 2002 describes the Informedia digital video library which provides automatic analysis of video streams, as well as interactive display and retrieval mechanisms for video data through various multimedia surrogates including titles, storyboards, and skims.

Another existing video retrieval technique is to model entire video clips in some manner, and then perform a model comparison during retrieval. While other models are available, the main model used is a temporal model.

One example of existing technology that utilizes temporal modeling for video retrievals is in Chen, L. and Stentiforda, F. W. M., Video sequence matching based on temporal ordinal measurement, Pattern Recognition Letters, Volume 29, Issue 13, 1 Oct. 2008, Pages 1824-1831. That paper proposes a novel video sequence matching method based on temporal ordinal measurements. Each frame is divided into a grid and corresponding grids along a time series are sorted in an ordinal ranking sequence, which gives a global and local description of temporal variation. A video sequence matching means not only finding which video a query belongs to, but also a precise temporal localization. Robustness and discriminability are two important issues of video sequence matching. A quantitative method is also presented to measure the robustness and discriminability attributes of the matching methods. Experiments are conducted on a BBC open news archive with a comparison of several methods.

Another approach using temporal modeling is described in Chen, L., Chin, K. and Liao, H., An integrated approach to video retrieval, ACM International Conference Proceeding Series Vol. 313, Proceedings of the nineteenth conference on Australasian database—Volume 75, 2008, Pages 49-55. There it is described that the usefulness of a video database depends on whether the video of interest can be easily located. This paper proposes a video retrieval algorithm based on the integration of several visual cues. In contrast to key-frame based representation of shot, the approach analyzes all frames within a shot to construct a compact representation of video shot. In the video matching step, by integrating the color and motion features, a similarity measure is defined to locate the occurrence of similar video clips in the database.

U.S. Pat. No. 7,486,827 describes a two-step matching technique is embodied in a video-copy-detection algorithm that detects copies of video sequences. The two-step matching technique uses ordinal signatures of frame partitions and their differences from partition mean values. The algorithm of this invention is not only robust to intensity/color variations it can also effectively handle various format conversions, thereby providing robustness regardless of the video dynamics of the frame shots.

SUMMARY OF THE INVENTION

These prior art approaches each have limitations.

With the key frame approach:

1) If frames are extracted based on a non-temporal basis (i.e., a set number of frames are skipped between each key frame), then differences in frames per second is (fps) will cause extracted key frames from similar videos to not align properly, yielding inaccurate results. Furthermore, if the temporal alignment is very close, but not 100% the same, it is possible for a scene change to cause a different frame to be selected for two videos at the same point in time.

2) If a scene change detection algorithm is used to select key frames, the retrieval will only be as good as the scene change detection algorithm, and a propagation of error may be in effect. From experience, it is very rare to see the exact same set of key frames extracted from two videos which were encoded differently from the same source. While the sets of extracted key frames need not be identical, variations ultimately impact relevance ranking in the matched results.

Temporal modeling often suffers from three large shortcomings as follows.

1) Aligning video data in the time domain is not an easy task. Reliably determining an exact frames per second (fps) value, and then extracting frames uniformly based on that fps becomes a large dimension to the retrieval problem.

2) Videos with little to no motion are very difficult to model in the time domain.

3) Very short videos often yield very little data to be temporally modeled, regardless of content.

In preferred embodiments, the present invention determines if two video signals match by extracting features from a first and second video signal, cross-correlating the extracted features thereby providing a cross-correlation score at each of a number of time lags; determining a mean magnitude of a difference of average values at each of the lags; and finally determining the similarity score based on both the cross-correlation scores and the mean magnitude difference scores, or optionally, then outputting an indication of a degree of match between the first and second video signals.

In a more specific implementation, it may involve linearly combining the cross-correlation score and the mean magnitude difference score at each lag to provide a combined score for each lag, or weighting the cross-correlation score and mean magnitude score equally.

If the target video signal is a candidate match for the query video signal as a result of comparing the similarity score to a threshold, it may also determine that target video signal matches the query video signal at an interval corresponding to the lag resulting in a highest combined score.

Furthermore, the feature is extracted from each frame the video signals may be based on a standard deviation of grayscale pixel values, a mean value of grayscale pixel values in the frame, and/or a difference between mean values of respective red and blue pixels in the frame.

In yet other embodiments, the invention may determine if each of the feature-extracted signals is substantially constant over time, and if not, then determining if there is a match from cell features extracted from respective cells that form a grid for each frame.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 2 shows an example of a letterbox introduced issue.

FIG. 3(d) is indicated by the shaded, outlined regions 300, 301, 302 and 303.

FIG. 5 illustrates the pixel range breakdown for the 3×3 grid regions for each frame.

FIG. 6 illustrates an example of one time series signal derived from a video stream.

FIG. 7 illustrates an example flatline signal.

FIG. 14-FIG. 16 show select result cases from the technology in operation.

DETAILED DESCRIPTION OF THE INVENTION

Figure 1:
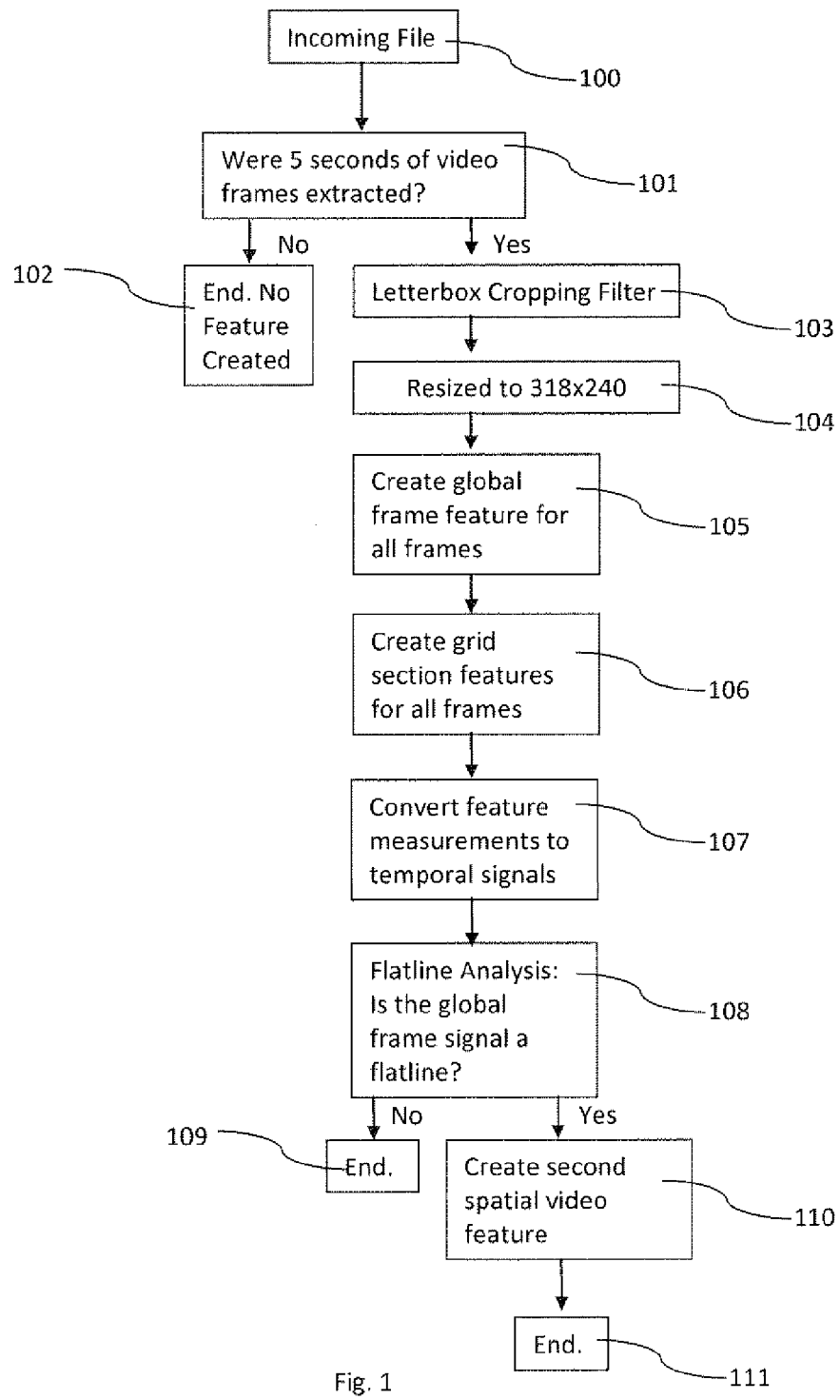
FIG. 1 illustrates a general process flow and decision process for video feature extraction.

A description of example embodiments of the invention follows.

With the increasing presence of online multimedia as well as the wide gamut of formats and encoding schemes available, the need for accurate and efficient video retrieval schemes are of growing importance. Video similarity matching is trivial when both the query and target video generate the same md5 hash value. Additionally, it is not very difficult to compare files in the same video format. In addition, metadata that can be extracted from multimedia files can also make searching a trivial task, as the algorithm becomes an exercise in text comparison. However, when md5 values and metadata either do not exist or are not helpful in determining matching, the only other data to use is derived from the multimedia content itself.

The present system, a Content-based Video Retrieval (CBVR) system, analyzes both video and audio streams from digital multimedia files, and calculates a feature (or features) that uniquely and abstractly describes the media. These features are then compared against each other during the retrieval process in order to establish their "similarity". Unfortunately, several factors can contribute to inaccuracies during the retrieval process, including, but not limited to, changes in file formats and encoding procedures, changes in content quality, and absent video and/or audio data. The possible factors that contribute to retrieval inaccuracy are discussed in more detail below. These factors exist naturally and frequently in real world applications, so it is important to select features that are invariant to these types of irregularities. The present system thus emphasizes tolerance to the variability found in a large generalized corpus of audio and video files.

Problem Statement

Given an arbitrary query multimedia file that contains video content, audio content, or both, find other similar multimedia files in a large repository of files in a quick and efficient manner. Similarity, in this context, is defined as multimedia files that may or may not have md5 hash duplicates of each other, do not have matching metadata, but have the same video/audio content differing by one or more of the following characteristics:

The query video or audio data is a subclip of the target video (or vice versa)

The query video and target video differ by quality or integrity (data corruption)

The query video and target video are of differing file and encoding formats

The query video and target video contain little to no temporal variation (content does not change much over time, e.g. a stationary surveillance video)

The query video and target video differ by aspect ratio

The query video and target video differ by color saturation

The query video and target video differ by contrast and/or brightness

The query video and target video contain no audio information

The query asset and target asset contain no video information

Current Technical Approach of the Preferred Embodiment

The preferred multimedia retrieval approach utilizes features from both digital video and audio data. In a specific example, digital video (such as in the form of extracted Joint Photographic Expert Group (JPEG) frames), as well as digital audio (such as in the form of extracted dual channel 22050 Khz Pulse Code Modulated (PCM) data) are used. They are first correctly aligned in the time domain. Features are then extracted from the data and temporal signatures are created. In some cases, specifically when the temporal signatures contain no discernable structure, a second feature is computed.

A combination of cross correlation analysis and mean magnitude difference analysis are then used during the retrieval process to match extracted features of digital media to one another.

Feature Extraction

For each media asset, an attempt to extract both audio and video features takes place. If either the audio or video stream is unavailable or encoded with an unrecognized codec, no feature extraction is possible for that stream. In addition, if the extracted stream is identified to be less than 5 seconds in length, no feature extraction is attempted for that stream. It was decided that anything less would yield content possibly undistinguishable from other content.

Video Feature Extraction

FIG. 1 illustrates the general process flow and decision process for the video extraction. A very brief summary of the process is as follows: In step 100, a new, incoming video file is presented to the system. In step 101, an attempt is made to extract frames from the video and a decision is made depending on the outcome. If 5 seconds worth of video frames were not able to be extracted, in step 102 the process is terminated with no video feature created. Otherwise, step 103 performs a letterbox cropping filter on each extracted frame. Step 104 forces each frame to be resized to 318×240. Step 105 extracts a single, statistical measurement from each frame. Step 106 divides each frame into 3×3 grid sections, and the same statistical measurement is computed for each grid cell. In step 107, the single frame measurements are converted into temporal signals. In step 108, a flatline analysis is performed on the global frame temporal signal, and a decision is made based on the outcome. If the signal is not determined to be a flatline, then the featuring is completed at step 109. Otherwise, another spatial needs to be computed in step 110. In step 111, the video featuring is completely done.

The following is a more detailed summary of the step-by-step process for video feature extraction:

1) In step 101, JPG frames are extracted from the original media file at a rate of 1 frame every 500 ms (or 2 frames per second). If less than 5 seconds worth of frames can be extracted (or 10 frames), the process is aborted and no feature is created.

Figure 2A:
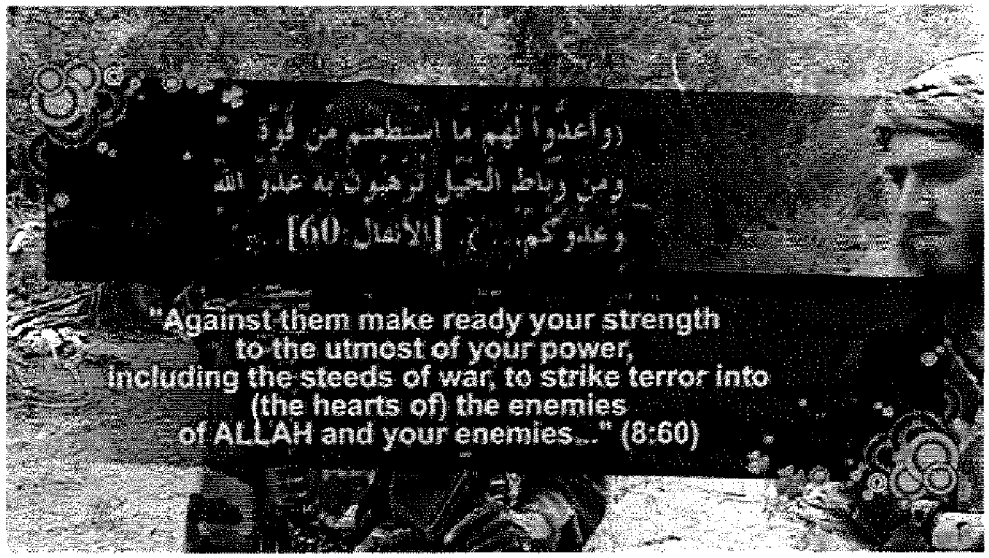
FIG. 2(a) was extracted from the original, 16:9 version of the video stream.
Figure 2B:
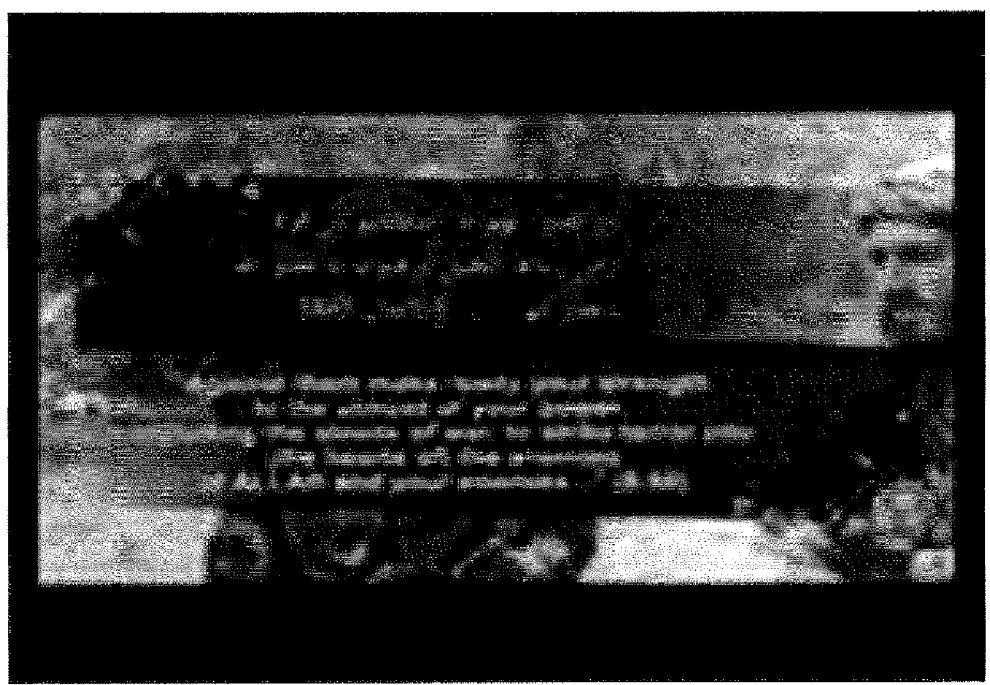
FIG. 2(b) was extracted from a version of the video where the original 16:9 stream was re-encoded into a 4:3 format with a severe black border resulting on the top and bottom, and minor black borders resulting on the left and right.

2) For each frame extracted during step 101, a letterbox cropping filter is applied (step 103) to the frame to remove a possible border artifact. This is performed on frames that contain a black border and will increase the likelihood of matching the frame with a black border to the original video because both frames have different aspect ratios. FIG. 2 shows an example of a letterbox introduced issue. FIG. 2a was extracted from the original, 16:9 version of the video stream. FIG. 2b was extracted from a version of the video where the original 16:9 stream was re-encoded into a 4:3 format with a severe black border resulting on the top and bottom, and minor black borders resulting on the left and right.

The Letterbox cropping filter first performs an edge analysis on the frame. There are many edge detection algorithms available, for example, the Sobel edge operator described in Sobel, I., Feldman, G., "A 3×3 Isotropic Gradient Operator for Image Processing", presented at a talk at the Stanford Artificial Project in 1968, unpublished but often cited, orig. in Pattern Classification and Scene Analysis, Duda, R. and Hart, P., John Wiley and Sons, '73, pp 271-2, and the Canny edge detector described in Canny, J., A Computational Approach To Edge Detection, IEEE Trans. Pattern Analysis and Machine Intelligence, 8:679-714, 1986.

Figure 3A:
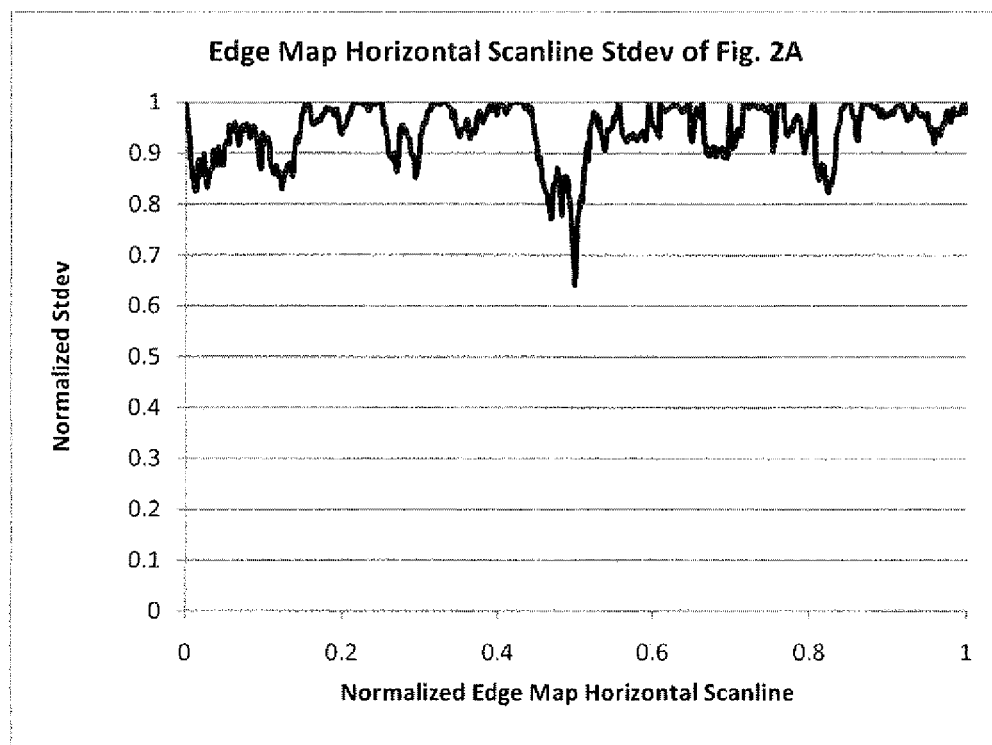
FIG. 3(a) represents the horizontal scan line edge variance and FIG. 3(b) represents the vertical scan line edge variance for FIG. 2(a).
Figure 3B:
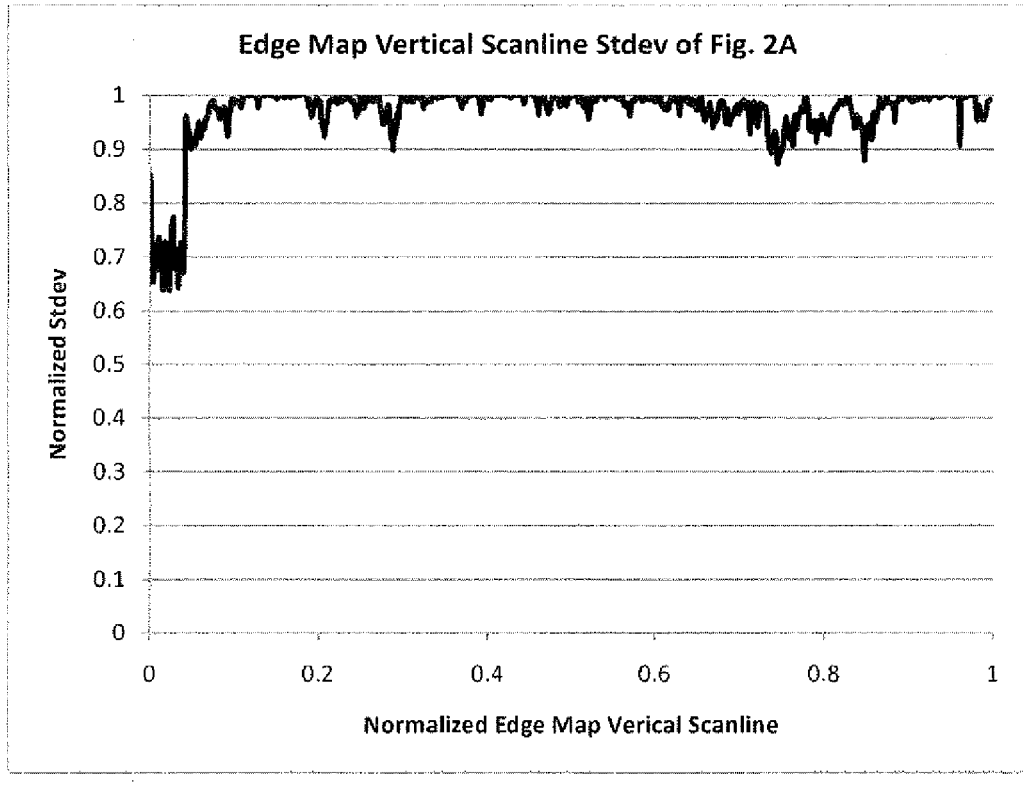
Figure 3C:
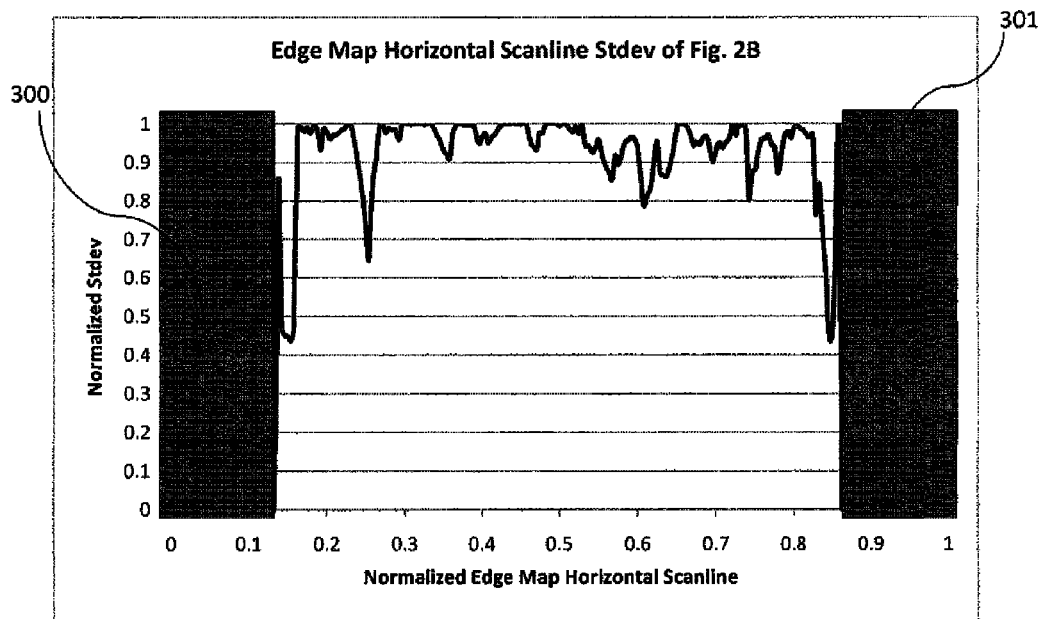
FIG. 3(c) and FIG. 3(d) represent the horizontal scan line edge variance and vertical scan line edge variance for FIG. 2(b), respectively. There is no area to remove from FIG. 3(a) and FIG. 3(b), and the area to remove from FIG. 3(c)
Figure 3D:
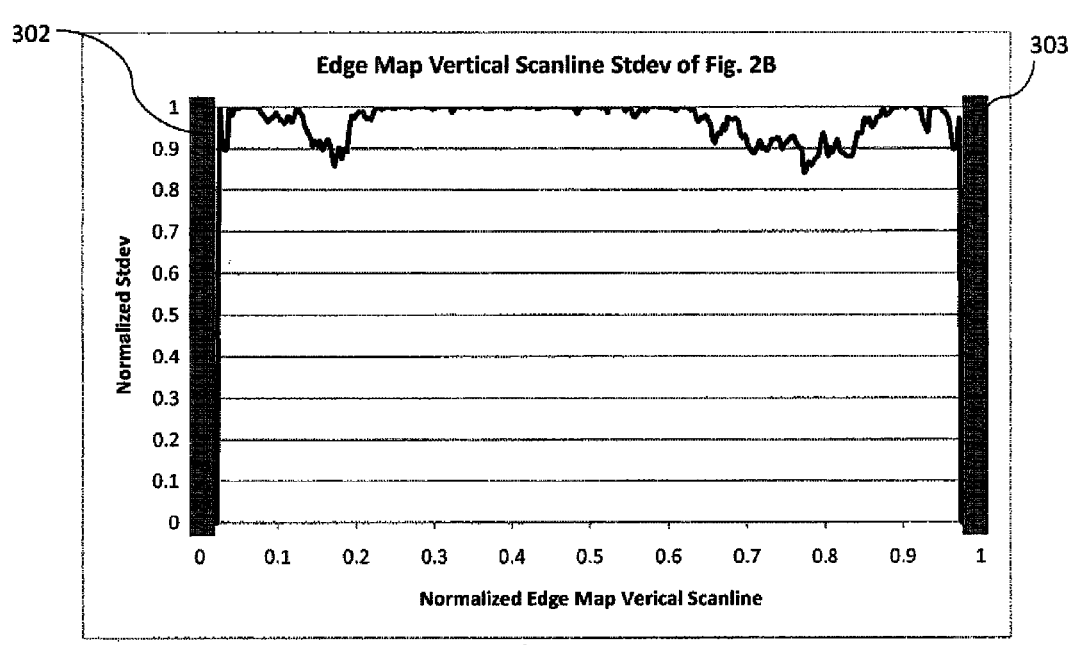
Figure 4A:
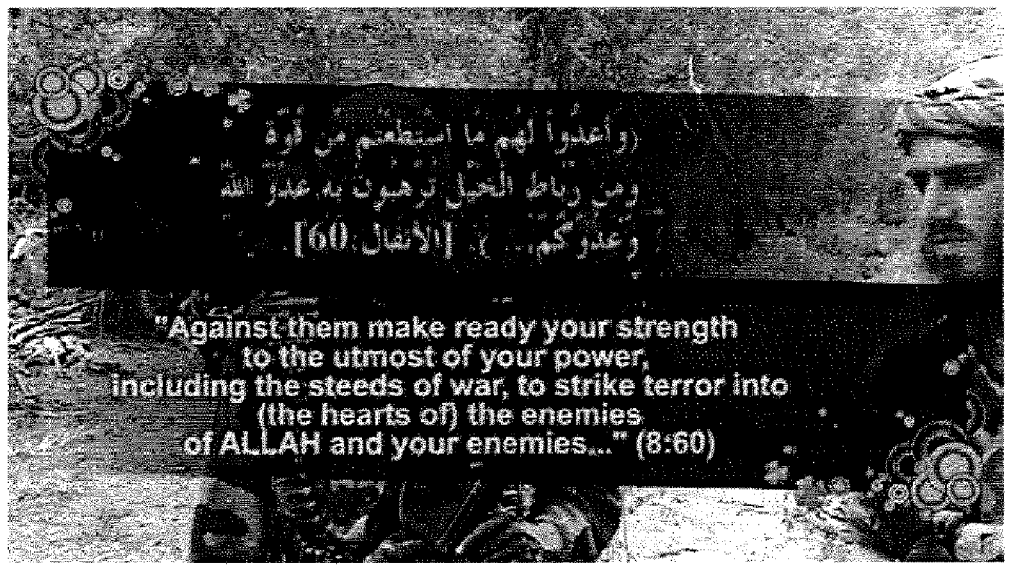
FIG. 4(a) was not cropped at all, whereas a significant amount was cropped from FIG. 4(b).
Figure 4B:
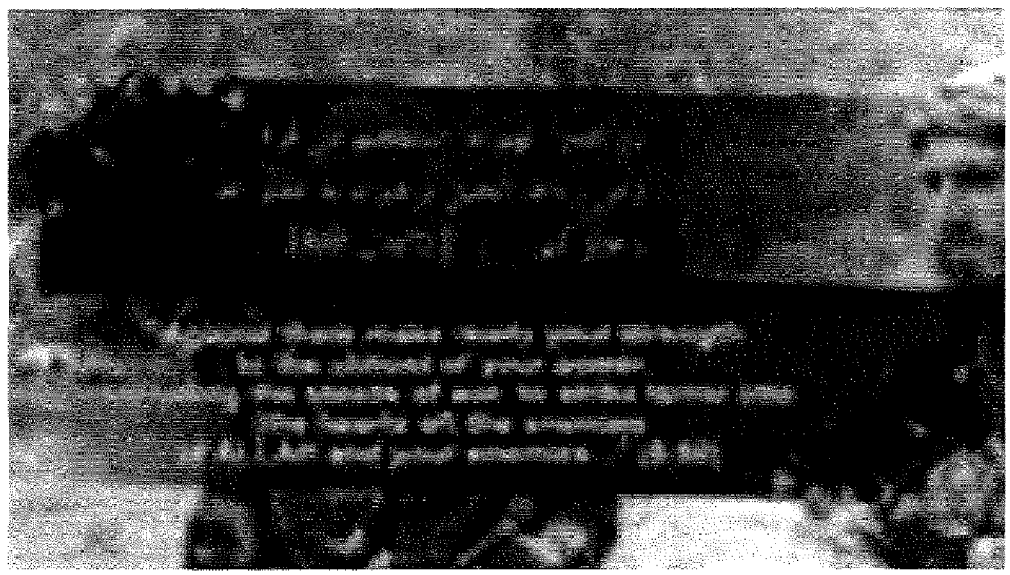
FIG. 4 shows the result of the letterbox cropping for the two frames shown in FIG. 2.

However, for speed and efficiency, a simple edge detection algorithm based on local pixel variance over a threshold was used. Then a horizontal and vertical scan line is variance analysis of the resulting edge map is conducted. Continuous regions of low scan line variance measured from the edge of the frame are discounted from feature consideration. A scan line standard deviation of 0.05 is used as a threshold. This value performs well at detecting actual edge in video frames, while suppressing possible minor false edges that may be an artifact of JPG compression. In FIG. 3, panels a and b represent the horizontal scan line edge variance (panel a) and vertical scan line edge variance (panel b) for FIG. 2a. Panels c and d in FIG. 3 represent the horizontal scan line edge variance (panel c) and vertical scan line edge variance (panel d) for FIG. 2b. There is no area to remove from FIGS. 3a and 3b, and the area to remove from FIGS. 3c and 3d is indicated by the shaded, outlined regions 300, 301, 302 and 303. FIG. 4 shows the result of the letterbox cropping for the two frames shown in FIG. 2. FIG. 4a was not cropped at all, whereas a significant amount was cropped from FIG. 4b.

Because the intended use of the filter was to remove possible borders, some rules have been incorporated to prevent too much cropping from inadvertently happening. The first rule is that if the total left and right combined removal amount is more than 35% of the total frame width, the frame is untouched. Similarly, the second rule is that if the total top and bottom combined removal amount is more than 35% of the total frame height, the frame is untouched. These amounts were derived by taking each expected worst possible case, a 16:9 forced into a 4:3 resulting in black top/bottom borders (rule 2), and a 4:3 forced into a 16:9 resulting in black left/right borders (rule 1), plus a little bit extra for expected error.

3) In step 104, the resulting letterbox filtered image then undergoes a forced resize to 318×240 for 3 reasons: 1) The computed features are very spatially generic, and do not suffer from reduced quality or lack of fidelity at the local pixel level, 2) Reducing large frame sizes (sometimes as high as 1000×500 and larger) greatly reduces feature extraction time, and 3) the letterbox cropping filter can possibly result in frames of differing sizes within the same video, however, as will be mentioned further on, a possible composite frame taken from several points in a video may have to be rendered for a further analysis, and this composite process requires the frames to be the same size. Thus, this forced resizing ensures that all frames are the same 318×240 size. 318×240 also ensures that each dimension is evenly divisible by 3, which is important for the grid region analysis described later in this document.

4) From step 104, once each frame has been resized, then the actual feature extraction takes place. The global frame feature in step 105 is a single point measurement that uniquely describes the frame that we are analyzing, so a measurement was picked that incorporated global pixel variance, global pixel averages, and color information.

First component: Standard deviation frame pixel grayscale values

Second component: Mean value of frame pixel grayscale values divided by 2.0

Third component: [(Mean value of frame R pixels−Mean value of frame B pixels)/4.0]+63.75

The goal of this feature extraction measurement is to represent the distribution of target pixel values as simply and as descriptively as possible by a single, scalar value. As statistical distributions are described by their moments, the first two components (stdev and mean, respectively) represent the first two moments of the distribution. The third, color-based component is added in to strengthen the feature in the color domain. All three of these components have a minimum value of 0.0 and a maximum value of 127.5. Therefore, to normalize the sum of these three components between 0.0 and 1.0, the final single point measurement for this frame is:

$$(\text{First component}+\text{second component}+\text{third component})/382.5$$

In addition to a single point measurement being calculated on the global frame, a localized grid analysis is also performed in step 106 on the frame in which a 3×3 grid is placed over the frame, and the same single point measurement is calculated for each of the 9 grid cells. The frame is 318×240, so all 9 grid regions are $119^{th}$ of the total frame, or 106×80, as illustrated by FIG. 5. In all, 10 single point measurements are computed for each frame during this analysis.

5) At step 107, when the preceding has been done for all frames extracted for the video, this yields several time series signals (time vs. measurement). In all, there are ten signals derived from one video stream, the signal for the global frame measurements and nine signals for each of the nine local grid measurements. FIG. 6 illustrates an example of one time series signal derived from a video stream.

6) As will be described below, the retrieval process relies on differences and uniqueness in these derived signatures. However, as is sometimes the case, video streams do not have a lot of signal change, especially short videos. For example, a 15 second clip captured from a surveillance camera showing little to no activity (as detected in step 108) would have little to no change in frame to frame point measurements, thus resulting in a "flatline" signal. See FIG. 7 for an example flatline signal A signal is identified as being a flatline signal when no generated signal points fall outside of +/−0.02 of the computed normalized mean. When a flatline is detected, another feature has to be computed outside of the temporal domain. Interesting enough, it was discovered that when a flatline was encountered, the video stream was probably displaying the same frame (or nearly the same frame) for the entire duration of the video stream.

Figure 8A:
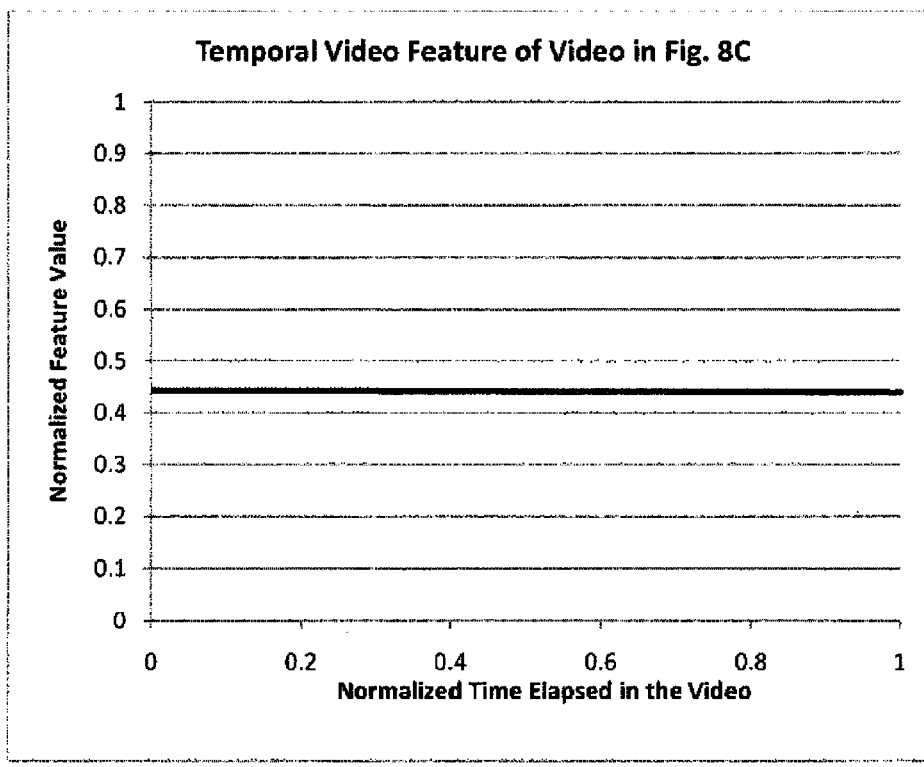
FIGS. 8a-8h illustrate static-content (flatline) videos, and how the computed spatial feature is used in this case
Figure 8B:
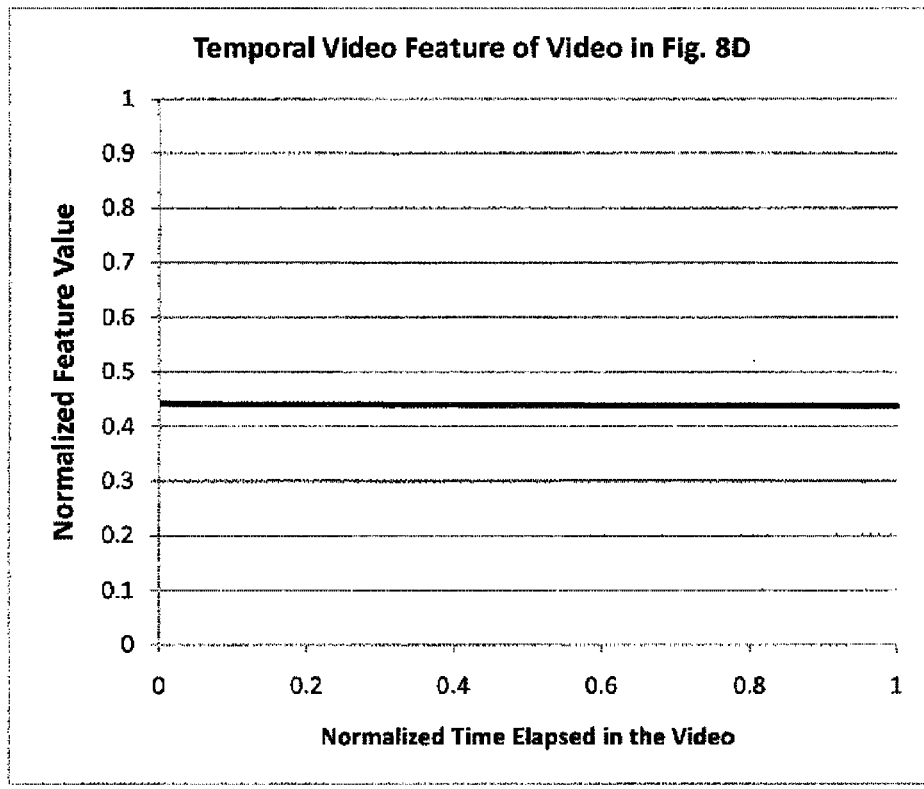
Figure 8C:
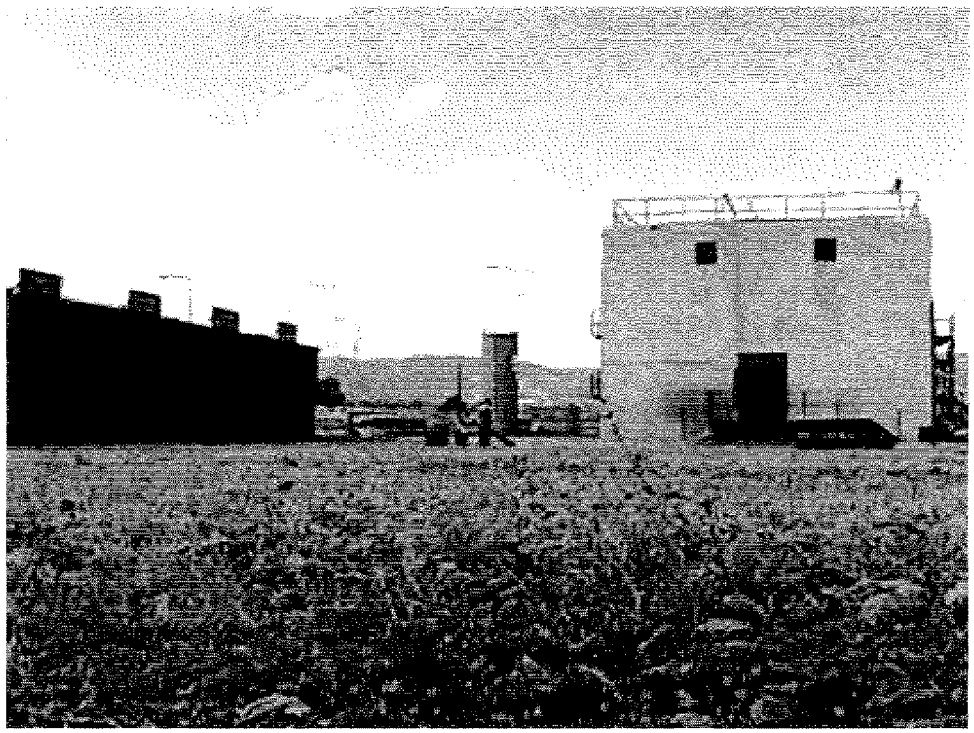
Figure 8D:
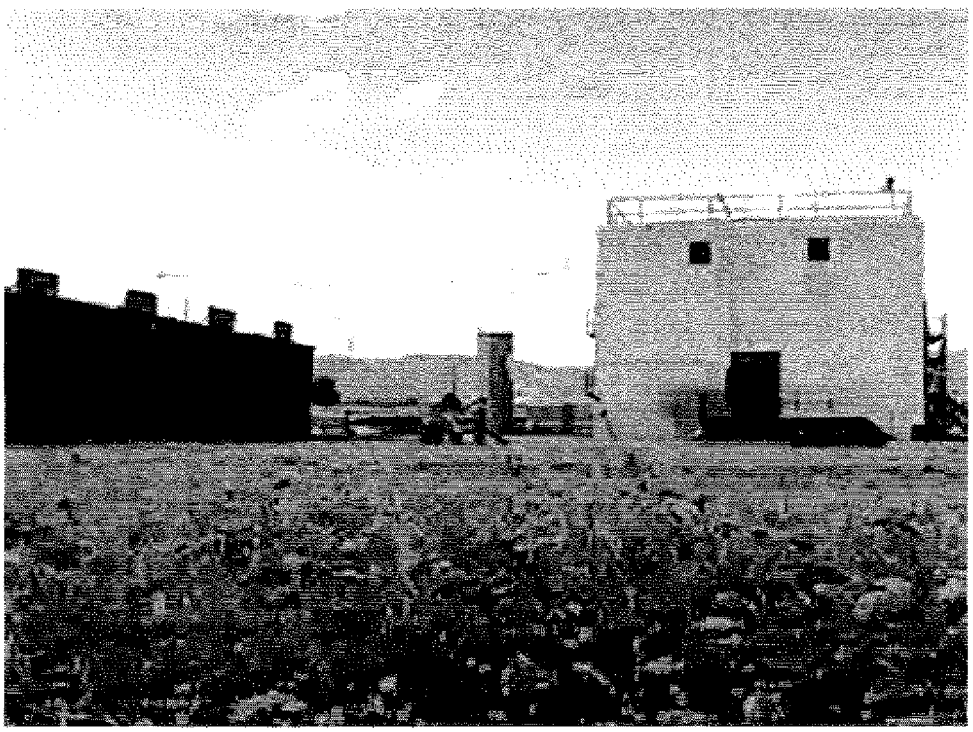
Figures 8E, 8F:
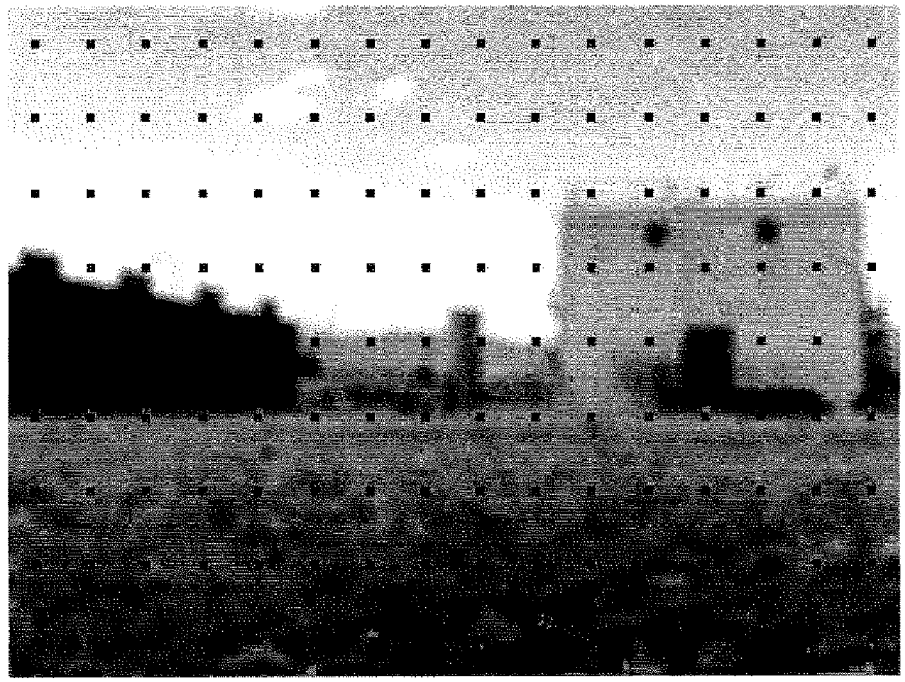
Figure 8G:
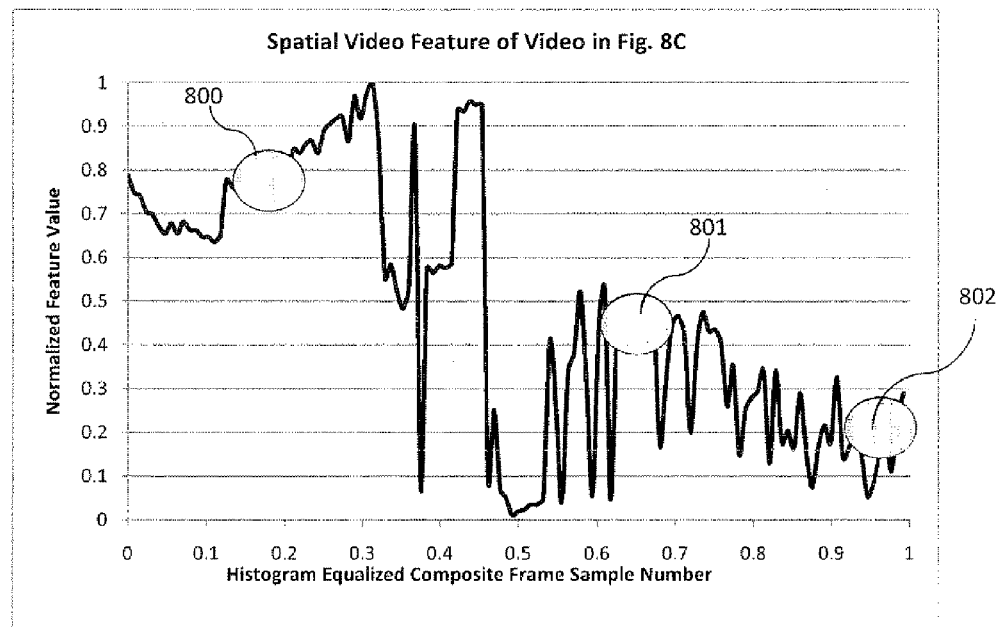
Figure 8H:
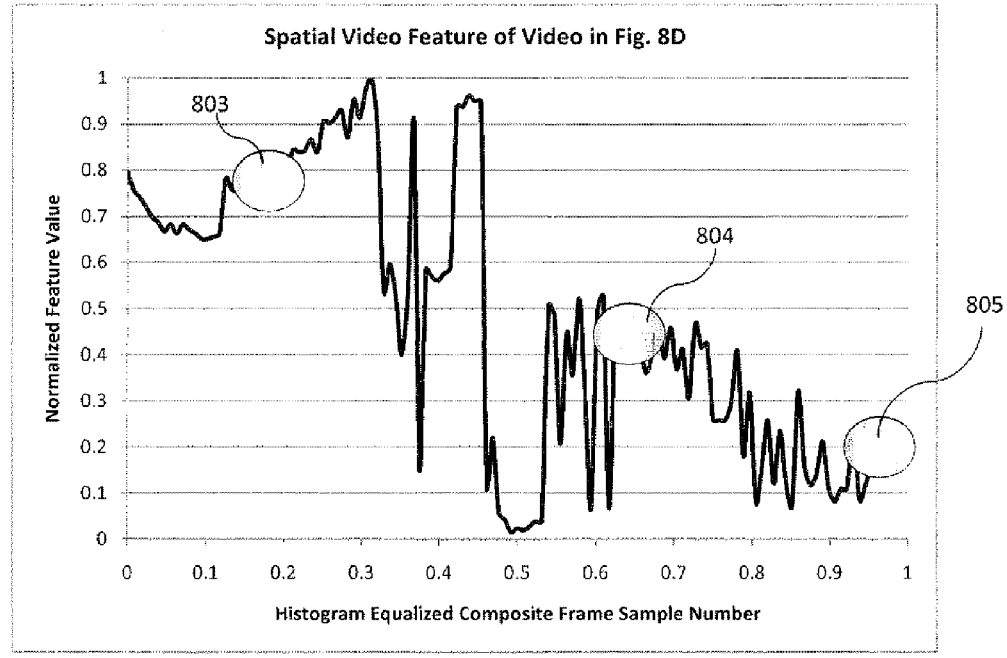
Figure 9A:
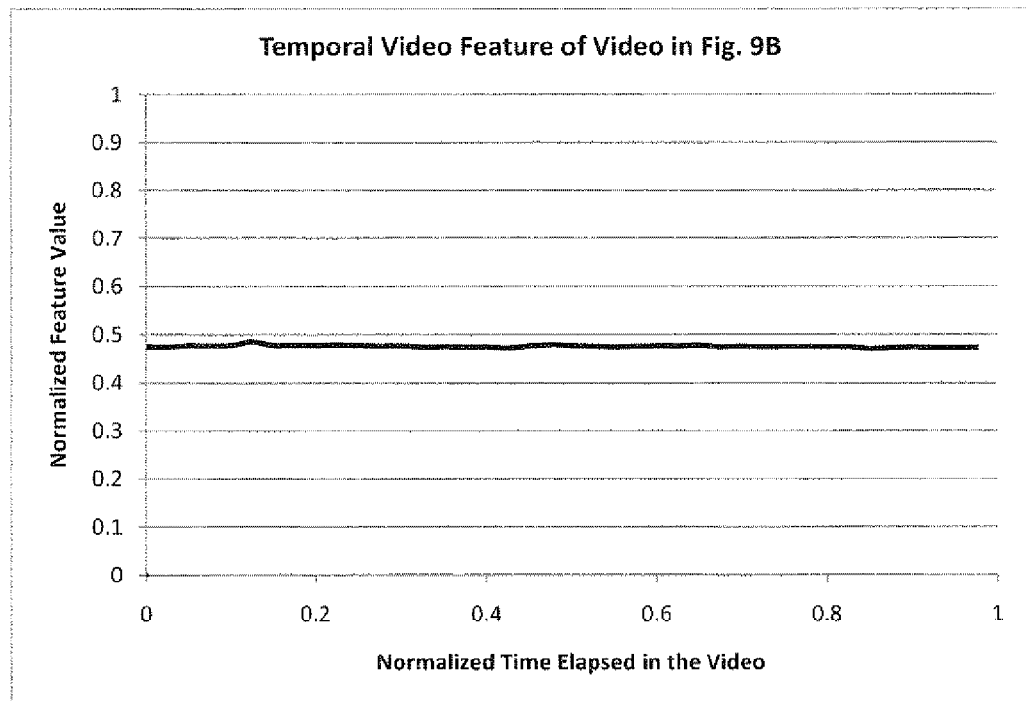
FIGS. 9a-9c illustrate another static-content video whose temporal feature is very similar to those presented in FIGS. 8a-8h. However, the spatial feature is very different.
Figure 9B:
Figure 9C:
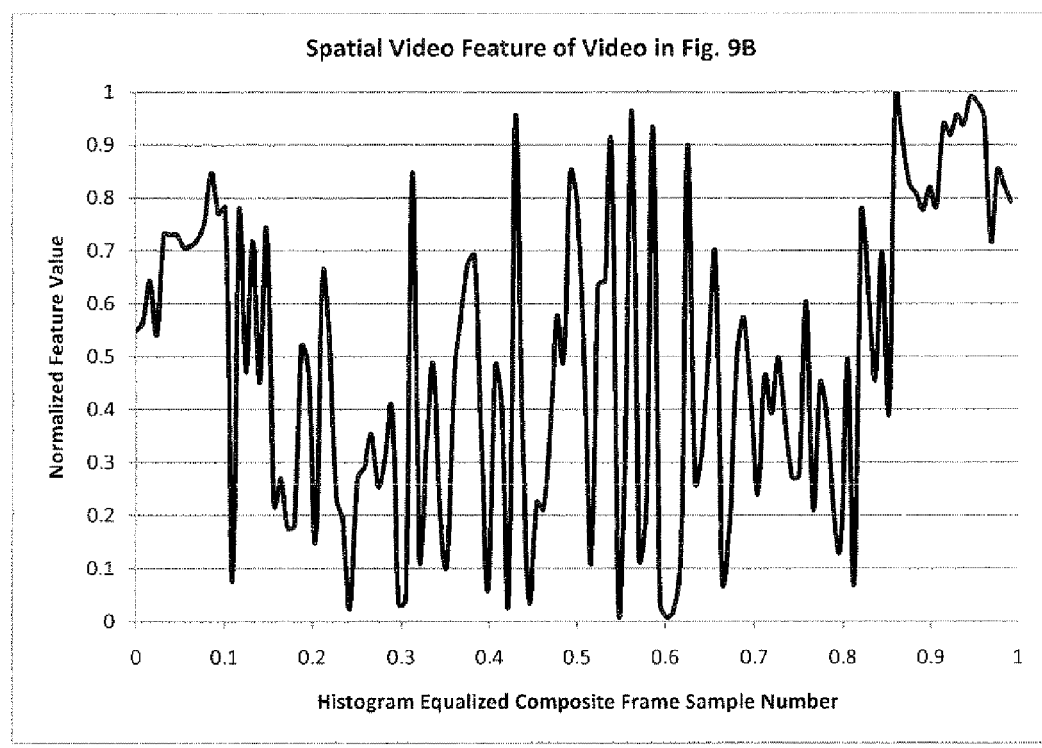

In these cases, at step 110, we compute a composite, grayscale average frame from the first, middle, and last frames in the extracted frame sequence. Next, we account for changes in contrast between composite frames by performing a standard histogram equalization on the composite frame. Next, we perform a mean filtering of the histogram equalized composite frame. This helps to eliminate small scale frame differences caused by different encoding processes as well as artificial differences possibly introduced by the composite process. Then sample pixel values are taken as regular intervals (16 columns by 8 rows for 128 total samples taken). This results in a signal of sampled values. This new feature is recorded along with the others for identified flatlines, and is used to refine results during the retrieval process. FIGS. 8*a*-8*h* illustrate an example of this flatline issue, and how this spatial feature is used to distinguish videos in this case. FIGS. 8*a* and 8*b* show the main temporal based video feature for two short five second videos that have been determined to be flatlines. These two videos also convey the same video content. However, they are in different file formats and different resolutions. FIGS. 8*c* and 8*d* show effects to the frames when the histogram is equalized using the 3-frame composite average. FIG. 8*e* shows the mean filtered version of the histogram equalized composite frame in FIG. 8*c*. The overlaid black squares show the intervals at which data is sampled from the frame to build the feature. FIG. 8*f* shows the path in which the samples are used to build the signal. The particular path implemented minimizes large differences from one sample to another. FIGS. 8*g* and 8*h* show the final, spatial feature for these two composite frames, indicating a unique, matching signature for this feature. Even though the spatial features are very similar, they have many subtle differences. The shaded circled regions in FIGS. 8*g* and 8*h* help identify where the feature is different on the small scale (compare 800 and 803, 801 and 804, 802 and 805). Conversely, FIGS. 9*a*-9*c* show an example of a different flatline video. Notice that the flatline in FIG. 9*a* is very similar in structure to FIGS. 8*a* and 8*b*, and has a very close magnitude as well. However, comparing FIG. 9*c* with FIGS. 8*g* and 8*h*, the spatial feature is very different.

Audio Feature Extraction

Figure 10:
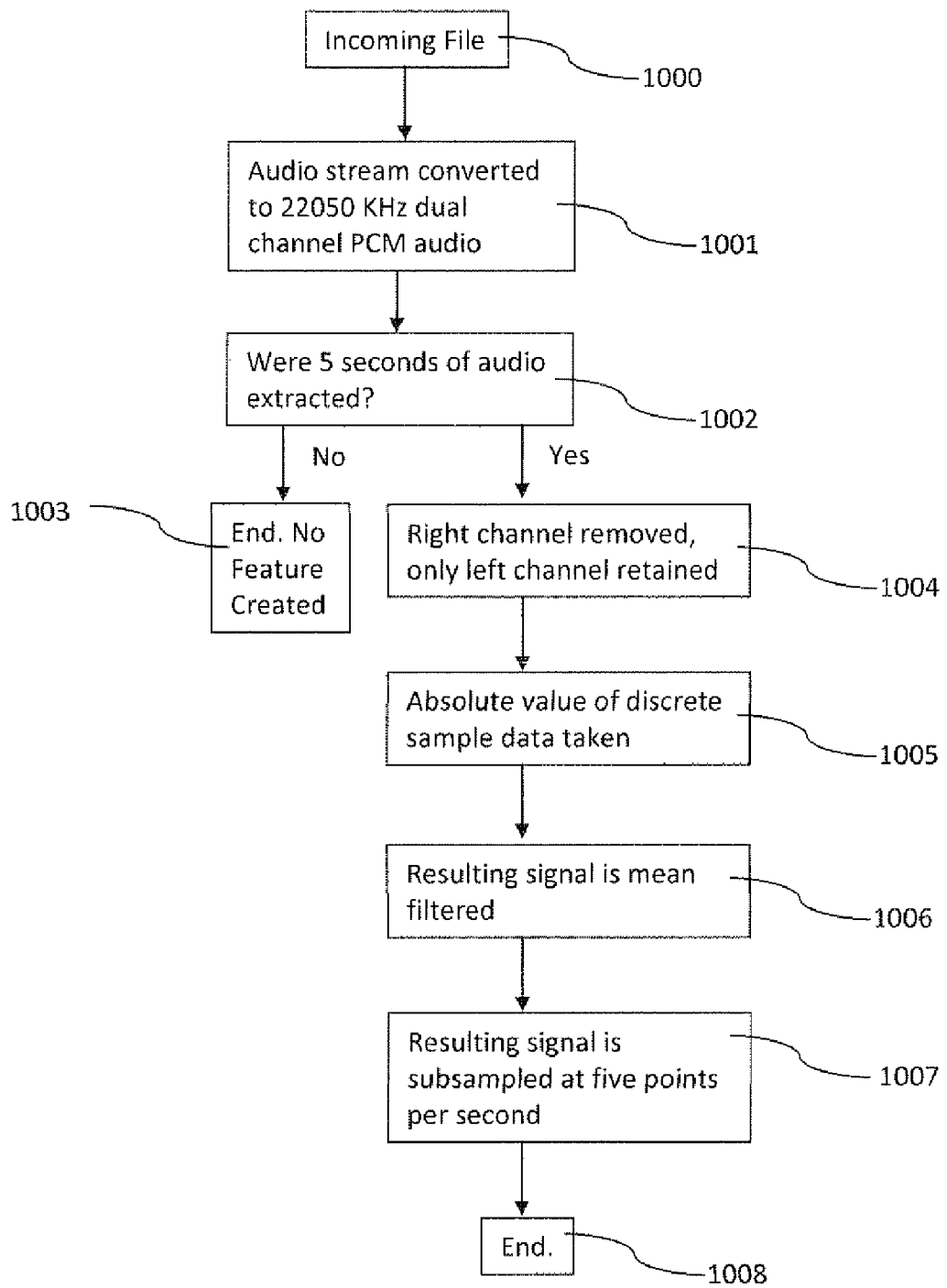
FIG. 10 illustrates the general process flow and decision process for the audio feature extraction.

FIG. 10 illustrates the general process flow and decision process for the audio extraction. A very brief summary of the process is as follows: In step 1000, a new, incoming video file is presented to the system. In step 1001, the audio stream of the incoming file is is extracted as a 22050 KHz dual channel PCM audio file. In step 1002, a decision is made depending on the outcome of step 1001. If 5 seconds worth of audio data was not able to be extracted, in step 1003 the process is terminated with no audio feature extracted. Otherwise, in step 1004 only the left channel is retained for analysis. In step 1005 the absolute value of the raw audio data is taken. In step 1006 the audio data is filtered with a half-second running mean filter. In step 1007, the data is subsampled at 5 points a second. In step 1008, the featuring is complete and the feature is built.

The following is a more detailed summary of the step-by-step process for audio feature extraction:

1) In step 1001, a 22050 KHz PCM (WAV) dual channel audio file is extracted from the original media file. If no WAV file is created, or less than 5 seconds of WAV data is created, the audio feature generation is aborted and no audio feature is created in steps 1002 and 1003.

2) In step 1004, only the left channel is retained for the feature extraction, the right channel is disregarded. For this instantiation of the system, we only use the left channel to avoid issues with having to mix the left and right channels together to form one audio signal prior to feature extraction. For another instantiation, the right channel could be used.

3) At step 1005, only the absolute value of the sample data is considered. Audio signals, by nature, have amplitude values that oscillate inversely on either side of 0. Taking the absolute value allows the feature space to be completely positive, while preserving the actual magnitude of the amplitude, 4) A running window mean filter is applied in step 1006 to the left channel data with a size of 11025. At 22050 Khz, this window corresponds to a half second. A half second window was chosen as a good benchmark for the minimum average length of silence between spoken phrases. This allows brief periods of silence in speech to have minimal amplitude, even when mean filtered. Mean filtering also allows audio signals to correlate well together, even if the source audio streams differed in dynamics or quality.

5) At step 1007, the resulting signal is approximated by subsampling the data, 5 samples per second. This subsampling greatly improves the speed of the comparison, while still providing good signal structure, uniqueness, and discriminatory properties. 5 samples per second were chosen for this instantiation although other sampling rates could have been chosen.

Figure 11:
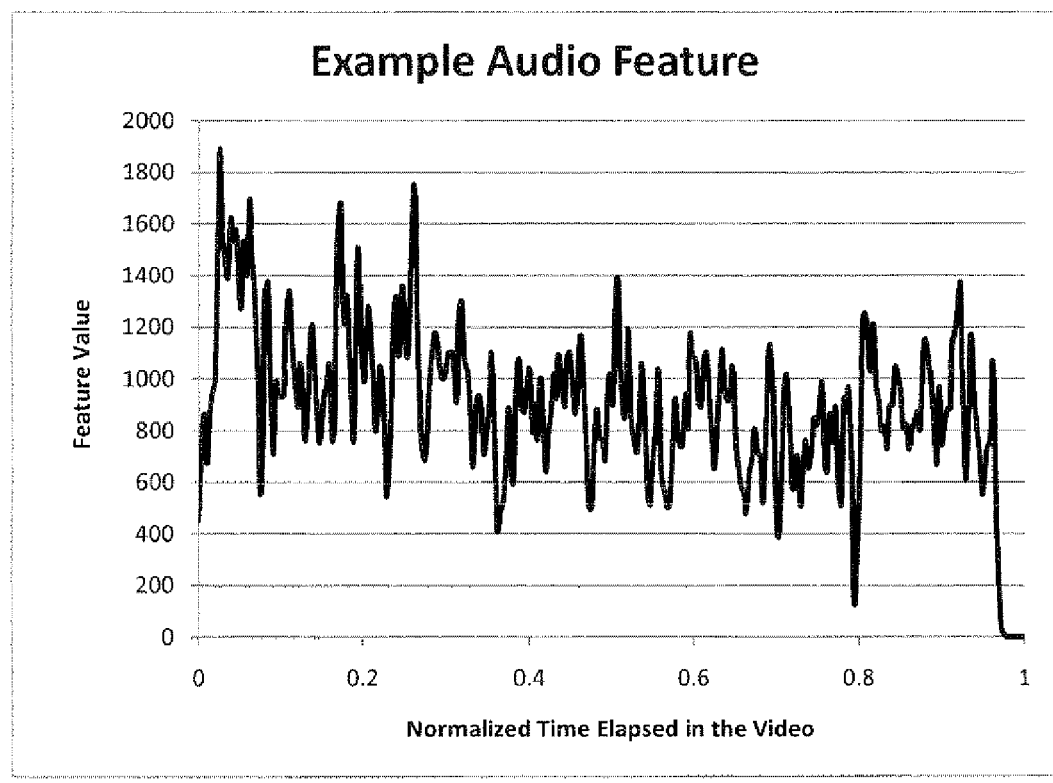
FIG. 11 shows an example of the audio feature signal.

6) The final audio feature is written in binary format. As opposed to the video features, the audio feature values are not normalized to [0.0, 1.0]. FIG. 11 shows an example of the audio feature signal.

Feature File System Representation

To optimize the system's processing speed, the extracted features are created and stored in binary flat files for quick distribution, access and maintenance.

Video and audio feature data is represented in one of two ways during the ingestion process. The first manner is referred to as a signature file, which is a binary encoding for a specific feature for one specific video or audio stream. The second manner is referred to as a repository file, which is a concatenated collection of signature files, with some additional header information that describes the size of the repository.

Signature Files

Each feature extracted, either video or audio, is written in a binary file format. These "signature" files contain some metadata regarding the file and the feature, as well as the feature itself. The signature files contain a 58 byte header which contains metadata regarding the extracted feature, followed by a variable amount of actual feature data. The header contains a 32-byte string that contains the complete md5 hash value for the media file. This is the primary lookup index for this file. Also included in the header are 2 flags, an active flag to dictate whether or not the signature is active, and a flatline flag to identify certain signatures as flatline (see elsewhere for more information on flatline features). The last 3 values in the signature file are values for the number of features in the signature file, the number of data points in the data block, and the number of samples per second for the data block. The last allows for a temporal mapping of data to time. Following the header is the actual data block. As described elsewhere, some features contain a dynamic amount of feature data that is a function of media length, whereas other features contain a fixed feature size. Table 1 illustrates the format of the feature signature files for dynamic feature lengths.

TABLE 1

Description of a binary feature signature file

| | Signature File Header | | | | | Signature File Data Bytes 59 – |
|---|---|---|---|---|---|---|
| Bytes 1-32 | Byte 33 | Byte 34 | Bytes 35-42 | Bytes 43-50 | Bytes 51-58 | (NP * 8) + 58 |
| Complete File MD5 | char value: Active 0\|1 | char value: Flatline 0\|1 | Unsigned 64 bit int value: Number of features | Unsigned 64 bit int value: Number of points (NP) | Double float value: Data points per second | Double float values: Feature Data |

Repository Files

When a new audio or video file is introduced to a content management system utilizing the techniques described herein, individual signature files are created, and then appended to existing repositories. A repository file has a header that describes the size of the repository, and this header is updated every time a signature is added to or removed. In addition, to better manage the size of repository files, as well as aid in the parallel distribution and accessing of very large repositories, a separate repository is created for each possible hex value (0-F), and signatures with md5 values that begin with a particular hex are only inserted into the repository matching that hex value (via repository file name). Table 2 illustrates the format of the repository files.

TABLE 2

Description of a binary feature repository file
Header, 8 byte unsigned 64 bit int value:
Number of signatures Signature File 1
Signature File 2
Signature File 3
...
Signature File N Because the header information for each signature file is intact in its corresponding repository file, it's possible to traverse individual signatures in a repository by calculating byte offset information from the signature header, and then moving to the next offset where the next signature starts. However, because signatures can be of varying data lengths, repository serial access is possible, but random access is impossible unless you know the direct offsets to seek to ahead of time.

When signatures are removed from a repository file, instead of physically removing the signature from the file and completely rewriting the end of the repository file, the to Active flag found in the head of the signature to be deleted is set from 1 to 0. Signatures flagged as 0 can be quickly skipped when the complete repository is traversed during the retrieval process.

Matching Algorithm

Figure 12:
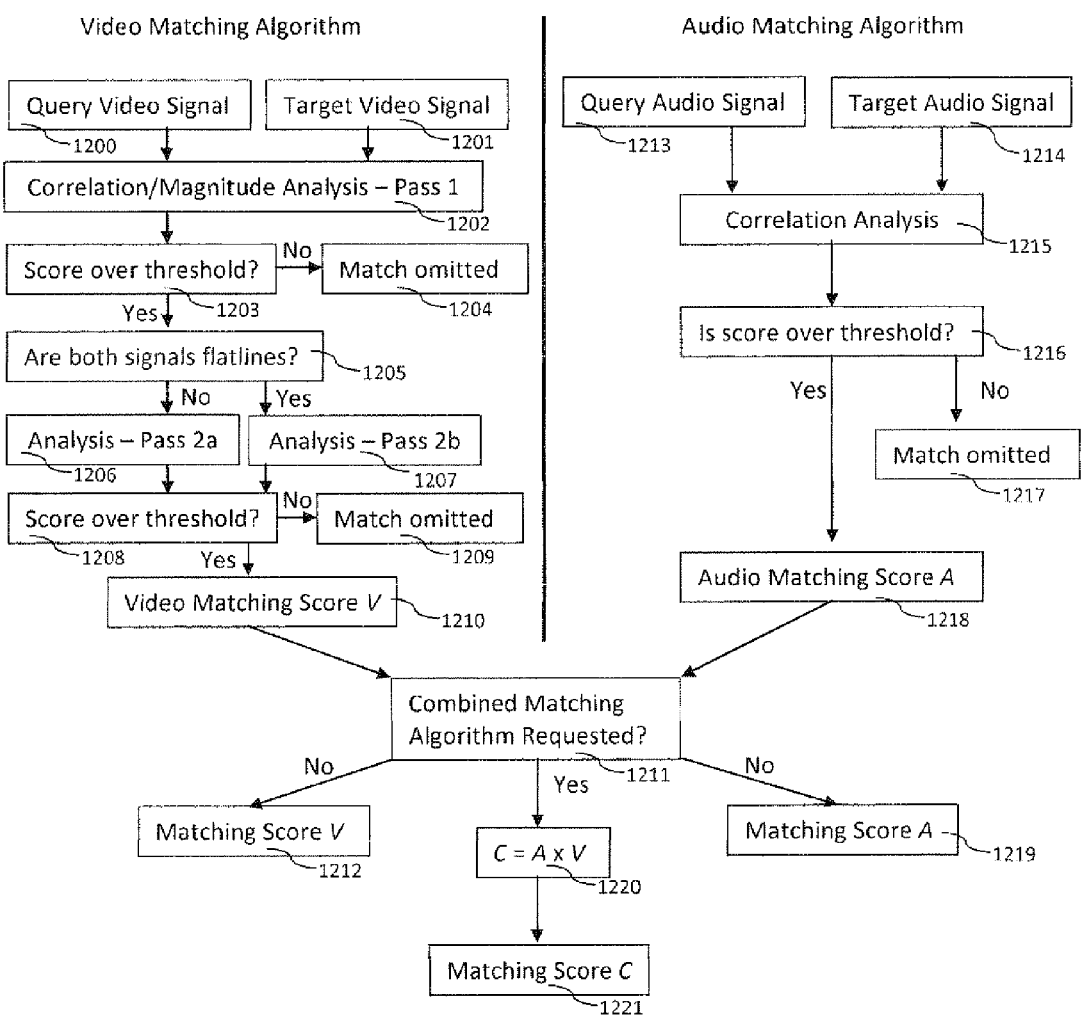
FIG. 12 illustrates the general process flow and decision logic for the video matching, audio matching, and combined video and audio matching algorithm.

FIG. 12 illustrates the general process flow and decision logic for the video matching, audio matching, and combined video and audio matching algorithm. A brief description of the process is as follows:

For video matching, query video features 1200 and target video features 1201 are loaded. In step 1202, the matching is performed on the two features. In step 1203, the matching score is compared to a threshold. If it us under the threshold, step 1204 omits the target as a match candidate. Otherwise, in step 1205, the features are checked for flatlines. If both are not flatlines, in step 1206 the individual grid features undergo the matching procedure. Otherwise, in step 1207, the spatial feature is matched against. In step 1208, if the matching score is not over the threshold, then the match is omitted in step 1209. Otherwise, the match is considered a video match with matching score V in step 1210.

For audio matching, query audio features 1213 and target audio features 1214 are loaded. In step 1215, matching is performed on the features. If they are not over the matching threshold in step 1216, then the target is omitted as match in step 1217. Otherwise, the match is retained in step 1218 with audio matching score A. If the combined matching score is not requested in step 1211, then either the video matching score 1212 or the audio matching score 1219 is the final score.

Otherwise, the product of A and V is computed in step 1220 and represents the final combined matching score C in step 1221.

A more detailed description of the matching algorithm follows.

The baseline algorithm for matching any signatures is a cross correlation analysis for non normalized features, and a combination of cross correlation analysis and mean magnitude difference analysis for normalized features.

The cross correlation analysis is a standard digital signal processing technique for finding signals embedded within other signals with a high degree of correlation at any lag delay. For example, if one signal was 10 data points in length, and another 50 points in length, the cross correlation would test the correlation at every possible matching point (in this case, the smaller signal could match the longer signal at any one of 40 matching points). The general equation for the cross correlation of two arbitrary 2D signals is:

$$(f \star g)[n] \stackrel{def}{=} \sum_{m=-\infty}^{\infty} f^*[m]g[n+m].$$

The cross correlation is very good magnitude independent way of comparing signals to one another. However, one drawback to the use of the cross correlation analysis in this application is that very short videos yield very short signals (as few as 10 data points), and it's possible for a very short signal to randomly correlate very highly to a long signal, even if the original videos that the signals were extracted from contain no similar content. A simple mean magnitude difference was added to help resolve this problem. The mean magnitude difference d of 2 signals is represented as:

$$d=1-[abs(mean(x)-mean(y))]$$

So for every lag delay in the cross correlation, this mean magnitude difference is also computed. The correlation score and the magnitude score are given an equal weight, averaged, and then the lag delay value that yielded the highest combined score is identified, and referred to as the matching similarity score for this pair of signals. An equal weight was assigned to the correlation and magnitude scores as it is determined that signal structure and shape (correlation) and signal magnitude are equally important in determining a match.

Video Matching Algorithm

The algorithm to match video features is based on the preceding matching algorithm. However, two retrieval passes are required. The first pass yields possible match candidates. The second pass filters false positives from pass 1. There are two possible routes for pass 2 depending on the pass 1 output: pass 2a and pass 2b. All passes are described in detail below. All matches for each pass must be over a particular threshold in order to be considered. The matching thresholds can be user defined, to maximize precision, recall, or another useful metric driven by use case and need. The thresholds can also be empirically derived at, by way of formal evaluation.

Video Matching Pass 1

Pass 1 (step 1202 in FIG. 12) is simply the matching algorithm described above for one query signature against a repository of signatures, given an input matching similarity threshold. The output of the matching algorithm contains the following information:

The query md5 value

The start and end time that the query video matched the target video

The target md5 value

The start and end time that the target video matched the query video

The final matching similarity score

The final matching correlation score

The final matching correlation weight (50% is the default)

The final matching magnitude score

The final matching magnitude weight (50% is the default)

The byte offset for the query signature (for quick random access for pass 2a)

The byte offset for the target signature (for quick random access for pass 2a)

The position of the query signature in its repository (for quick random access for pass 2b)

The position of the target signature in its repository (for quick random access for pass 2b)

Whether or not the query signal was a flatline (0|1)

Whether or not the target signal was a flatline (0|1)

Any matches in this list (that exceed the threshold test in step 1203) are possible matches.

The information from pass 1 is then passed on to pass 2 to confirm the findings. However, comparing two flatline signals in this manner is not really meaningful. Often the magnitudes will match, and the flatline structure indicates that there is not a lot for the correlation analysis to pick up on. Thus, if pass 1 reports that the match was between 2 flatline signals, pass 2b is used for pass 2. Otherwise, pass 2a is used for pass 2.

Video Matching Pass 2a (step 1206)

For any pass 1 matches that have been determined (from step 1205) to not be between 2 flatline signals (i.e., flatline vs. non flatline, non flatline vs. flatline, non flatline vs. non flatline), the individual 9 local grid signatures are sent to the retrieval. Because the local grid signatures are the same size and contain the same number of points as the original global frame signature used in pass 1, and because the byte offset of the query signature and the byte offset of the target signature are reported from pass 1, they are used to seek immediately to the correct byte offset, and perform the match for each local grid signature.

The following two conditions must be met for a pass 2a match: 1) All 9 grid cells much have a matching score higher than the input threshold, and 2) all 9 grid cells must report the same matching time interval (specified by the retrieval parameter, this is currently is set to 1 second) where the highest matching score occurred. Matches that pass these 2 criteria are retained as a final match for the query. If not, they are removed from consideration.

Video Matching Pass 2b (step 1207)

For pass 1 matches that have been determined to be between 2 flatline signals, the composite frame spatial feature is used in the same matching algorithm. Because this feature is not dependent on media length, and has a fixed record length, the position of the query signature and the position of the target repositories are used to seek immediately to the correct byte offset, and perform the match. If the matching score for pass 2b is still over the threshold, this match is retained as a final match (step 1210) for the query. If not, this match is removed from consideration (step 1209).

Audio Matching Algorithm (steps 1213-1218)

The audio matching algorithm is simply the general matching algorithm described above for one query signature against a repository of signatures, given an input matching similarity threshold. However, for this match, only the correlation score is used as the matching score. Because the audio features are not normalized, the mean magnitude difference score is not applicable. The output is a list exactly the same as the list produced for pass 1 of the video matching algorithm. However, in the case of audio, there is only one pass. The output list of matches is final.

Combined Video and Audio Matching (step 1211 and those following)

In cases where the query file has both audio and video data, and thus both audio and video signatures, it is possible (and recommended) to couple the audio and video retrieval matching scores together, to further discriminate similar videos from non similar videos. The method to combine the audio matching score A (step 1219) with the video matching score V (step 1212) into a combined score C (step 1220) is defined as:

$$C = A \times V$$

Several combination algorithms were examined. The first, which was C=max(A, V), performed well at honing in on matching videos that had either high matching video scores or high matching audio scores. However, it suffered at accurately ranking, for example, matching videos that had similar video quality but differing audio quality. A video with a high matching video score and high matching audio score should have a higher combined matching score than a video with a high matching video score and a lower matching audio score. C=max(A, V) did not allow for this.

The second combination algorithm examined, which was C=avg(A,V), performed well at providing a general picture at how the video matched on a combined audio and audio level. However, the variance between A and V is masked. For example, if a video had a matching video score of 0.99 and a matching video score of 0.91, using C=avg(A, V), this is still an admirable combined matching score of 0.95. However, this masks the fact that the video score matched as low as 0.91, which is not ideal.

C=A×V was settled on, ultimately, because it scales the disparity between similar and non-similar videos geometrically, not linearly. More specifically, similarity scores in audio and video get amplified when multiplied together, further pushing similar results away from dissimilar results. For example, if one video matched with a 0.98 matching audio score and a 0.96 matching video score, using C=A×V, the combined score would still be a high 0.94. However, if another video matched with a 0.95 matching audio score and a 0.92 matching video score, using C=A×V, all of a sudden the combined score is dropped to 0.87.

is Retrieval Process

Four modes of searching capability are offered:
1) Video only search—only the video features of target files are searched against
2) Audio only search—only the audio features of target files are searched against
3) Audio or video search—On a target file by target file basis, if both the audio and video features are present, the retrieval uses a combined audio/video search for the asset. If not, then the search uses either the audio or the video, whichever is available.
4) Audio and video search—both the audio and video features of target files are searched against, and targets that do not specifically contain both are excluded from consideration.

Figure 13:
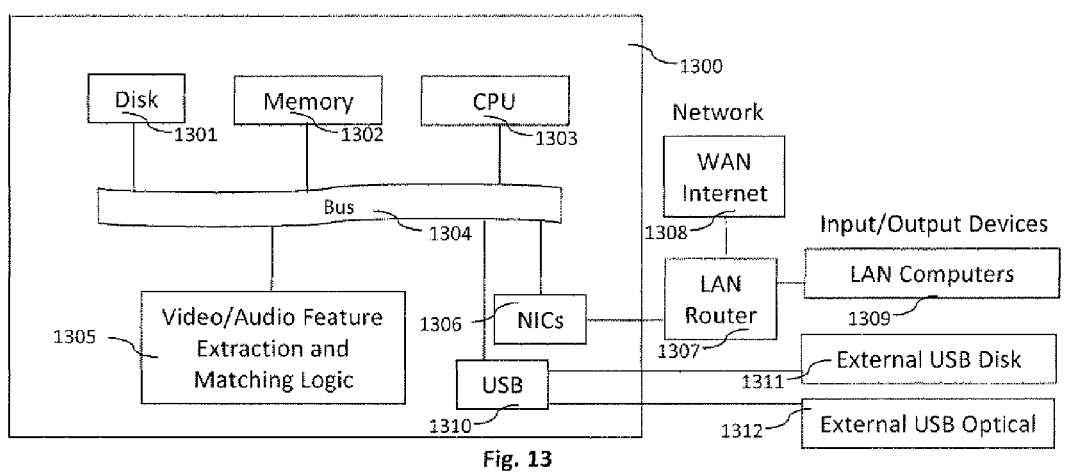
FIG. 13 illustrates the video matching technology housed within the compute environment for which it was designed.

FIG. 13 illustrates the video matching technology housed within the compute environment for which it was designed. System disk 1301, memory 1302, CPU 1303 and the video feature extraction and matching logic 1305 are all interconnected within the data processing environment 1300 by a bus 1304. It should be understood that other elements of a system may be present, such as input devices that provide video/audio data sources and output devices such as displays and audio speakers. However these elements are not critical to the operation of the matching techniques described herein. The data processing environment communicates to local external devices via a Universal Serial Bus (USB) port 1310, and communicates with other networked devices via one or more Network Interface Cards (NIC) 1306. The NIC(s) are connected directly to a Local Area Network (LAN) router 1307. In turn, the LAN router allows connectivity to other LAN computes 1309 as well as the outside internet 1308. The input source videos for the retrieval technique would originate from internet downloads via HTTP or FTP 1308, other networked LAN computer disks 1309, local USB external disk 1311 or local USB optical disk 1312, either via CD or DVD. Output retrieval results might be stored on local disk 1301, stored locally on external USB devices 1311 1312, stored on network computer disk 1309, or served in real time to internet-based clients 1308.

Results

Three retrieval cases are presented below, illustrating different challenges that the technique attempts to solve.

Figure 14:

Case 1: Query video is a short video with no audio stream and very little video content variability. FIG. 14 is a screenshot of a retrieval application based on the technique described in this document after a search was conducted using a short, 5 second video with very little frame-to-frame change from a stationary camera. The search brought back all 3 other versions of the video, differing not only by file type and quality, but also frame resolution. In addition, no false positives were brought back as matched in this result set.

Case 2: Query video is a longer video with audio. FIG. 15 is a screenshot of the same retrieval application based on the technique described in this document. The search brought back 3 other versions of the video, differing not only by file type and quality, but it also brought back a version of the query video that was 50% the duration. This particular matching result (5-6) was a subclip of the original query video. In addition, no false positives were brought back as matched in this result set.

Figure 16:
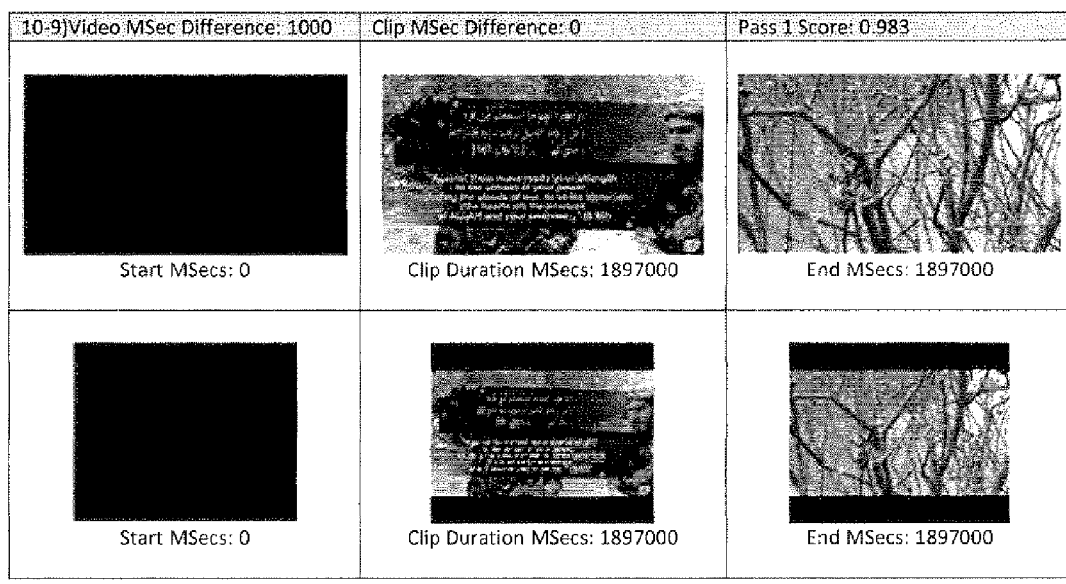

Case 3: Query video is a longer video with audio. FIG. 16 shows a screenshot of the same retrieval application based on the technique described in this document. The search brought back all 11 other versions of the video, differing not only by file type and quality, but also by letterbox and aspect ratio encoding. In addition, no false positives were brought back as matched in this result set.

Even though the size of these example corpuses is small (much, much smaller than the real-world corpuses for which the technique was designed), the nature of the features being computed and the discriminatory nature of the matching algorithm will not falter is to added noise from a larger sized repository.

CONCLUSION

Existing techniques utilized in academia and industry attempt to solve the problem of video retrieval. However, many of them are based on either 1) key frame selection and comparison, which can suffer greatly from inaccuracies in the key frame selection process as well as forcing a domain-specific solution (image retrieval) on another domain (video data), which is not scientifically optimal, and 2) a temporal representation of the video, which can suffer when the content of the video does not yield a unique temporal signature. The preliminary results and evaluation indicate that the PFI technique proposed here is robust in retrieving similar videos and is invariant to many of the real world challenges described in the problem statement earlier in this document, and is therefore novel and superior to many of the existing video retrieval is techniques currently employed today.

Specifically, the proposed technique is invariant to retrieving videos of different formats, as the nature of the video feature, specifically the single point scalar measurement per frame or grid region, are robust to differences in frame encoding and quality. This also allows the technique to be invariant in retrieving corrupt versions of videos given non corrupt versions, or vice versa. The proposed technique is also robust at accurately detecting videos containing little to no motion, regardless of video length. This is possible by use of spatial feature, which is used when two videos have been identified as having little or no content variation (flatline). The technique is multi-dimensional, meaning that it is robust at using video features when only video features are available, and likewise for audio features, but will utilize both audio and video features, when present, for higher accuracy. The technique is also robust at finding subclips within video files, as the cross correlation analysis attempts to find smaller signals embedded within longer signals. Lastly, the technique is invariant to letterbox-encoded issues, due to the specific letterbox cropping filter employed See Table 3 for specifics.

TABLE 3

Listing of specific searches, and what type of challenge they overcome.

| Specific Challenge Area | Query Number | Query Video MD5 | Matched Video MD5 |
|---|---|---|---|
| Different formats | 7 | 2399288E6B2292350F20DFD10C5AADCB | C799D4A31FE896825DC020537D35A1D0 |
| Good video to a corrupt video | 4 | 1E7496F3A18A8F941209A41605039CA6 | 6E5AA1131021246980C2E71A9481EC0C |
| Little to no motion | 21 | BAF2E6AEF34ECFB3C7F0FA4C04B04395 | FE9658D977FAA073D4DBD179AA828456 |
| Durations may be slightly off | 69 | B40286E66A9EF70C3BF1B1A62B7634CB | BDD52B33E46357EDDC5A8F059D4006C5 |
| Containing only video | Many | | |
| Containing only audio | Many | | |
| Clip found within a much larger video | 75-1 | 660AD92C044E5807BC05944CEC50A6AC | 8F9E7735BE6B4AE0739BEC4A40DC6C5A |
| Changes in aspect ratio or letterbox | Many | | |

What is claimed is:

1. A method for determining if two video signals match, the method comprising:

extracting features from a first video signal to provide a first feature-extracted signal;

extracting features from a second video signal to provide a second feature-extracted signal;

cross-correlating the first and second feature-extracted signals to provide a cross-correlation score at each of a plurality of time lags;

determining a magnitude of a difference of average values of the first and second feature-extracted signals at the plurality of lags to provide a mean magnitude difference score at each lag; and determining a similarity score between the first and second feature-extracted signals based on both the cross-correlation scores and the mean magnitude difference scores.

2. The method of claim 1 further comprising:

providing an indication of a degree of match between the first and second signals.

3. The method of claim 1 wherein determining a similarity score further comprises:

linearly combining the cross-correlation score and the mean magnitude difference score at each lag to provide a combined score for each lag; and determining a highest combined score across a plurality of lags.

4. The method of claim 3 wherein linearly combining comprises weighting the cross-correlation score and mean magnitude score equally.

5. The method of claim 1 wherein the first feature-extracted signal is derived from a feature extracted from each frame of a query video signal and the second feature-extracted signal is derived from a feature extracted from each frame of a target video signal among a plurality of target video signals;

and the method further comprises:

determining if the target video signal is a candidate match for the query video signal by comparing the similarity score to a threshold; and if the target signal is a candidate match, determining if the target video signal matches the query video signal at an interval corresponding to the lag resulting in the highest combined score.

6. The method of claim 5 wherein the feature is extracted from each frame of the is query video signal and of the target video signal based on a standard deviation of grayscale pixel values in the frame, a mean value of grayscale pixel values in the frame, and a difference between mean values of respective red and blue pixels in the frame.

7. The method of claim 6 wherein the feature is computed as a normalized sum.

8. The method of claim 1 further comprising:
  determining if each of the first feature-extracted signal and the second feature-extracted signal is substantially constant over time; and
  if at least one of the first feature-extracted signal and the second feature-extracted signal is not substantially constant over time, determining if the first video signal matches the second video signal based on a plurality of cell features extracted from respective cells forming a grid for each frame of the first video signal and of the second video signal, each cell feature based on at least one of a standard deviation of grayscale pixel values in the corresponding cell, a mean value of grayscale pixel values in the corresponding cell, and/or a difference between mean values of respective red pixels and blue pixels in the corresponding cell.

9. The method of claim 8 wherein the second video signal is confirmed as a match for the first video signal only if all of the cell features attain respective maximal values substantially simultaneously.

10. The method of claim 1 further comprising:
  determining if each of the first feature-extracted signal and the second feature-extracted signal is substantially constant over time; and
  if the first feature-extracted signal and the second feature-extracted signal are substantially constant over time, determining if the first video signal matches the second video signal based on a spatial distribution feature extracted from both the first video signal and from the second video signal.

11. The method of claim 1 additionally wherein
  the first and second video signals are audio-video signals, each audio-video signal comprising audio and video data;
  the first and second feature-extracted signals are derived from a video feature extracted from respective first and second audio-video signals; and
  the similarity score is a video similarity score;
  and the method further comprises:
  cross-correlating third and fourth feature-extracted signals derived from audio features extracted from respective first and second audio-video signals to provide an audio cross-correlation score at each of a plurality of lags;
  determining an audio similarity score between the third and fourth feature-extracted signals based on the audio cross-correlation scores;
  multiplying the video similarity score and the audio similarity score to provide an audio-video similarity score; and
  determining if the first audio-video signal matches the second audio-video signal by comparing the audio-video similarity score to a threshold.

* * * * *

UNITED STATES PATENT AND TRADEMARK OFFICE
CERTIFICATE OF CORRECTION

| | | |
|---|---|---|
| PATENT NO. | : 8,295,611 B2 | Page 1 of 1 |
| APPLICATION NO. | : 12/538476 | |
| DATED | : October 23, 2012 | |
| INVENTOR(S) | : Berg et al. | |

It is certified that error appears in the above-identified patent and that said Letters Patent is hereby corrected as shown below:

Col. 16, line 61 should read: "from each frame of the query video signal and of the target"

Signed and Sealed this
Second Day of April, 2013

Teresa Stanek Rea
*Acting Director of the United States Patent and Trademark Office*